US012806942B2

(12) United States Patent
Broens

(10) Patent No.: US 12,806,942 B2
(45) Date of Patent: Nov. 24, 2026

(54) CONNECTING ELEMENT AND TRACTION CHAIN

(71) Applicant: Nordic Traction Oy, Loimaa (FI)

(72) Inventor: Renoldus Broens, Salo (FI)

(73) Assignee: Nordic Traction Oy, Loimaa (FI)

( * ) Notice: Subject to any disclaimer, the term of this patent is extended or adjusted under 35 U.S.C. 154(b) by 292 days.

(21) Appl. No.: 18/608,067

(22) Filed: Mar. 18, 2024

(65) Prior Publication Data

US 2024/0308280 A1 Sep. 19, 2024

(30) Foreign Application Priority Data

Mar. 17, 2023 (EP) .................................... 23162743

(51) Int. Cl.
*B60C 27/08* (2006.01)
*F16G 15/00* (2006.01)

(52) U.S. Cl.
CPC .......... *B60C 27/083* (2013.01); *B60C 27/086* (2013.01); *F16G 15/00* (2013.01)

(58) Field of Classification Search
CPC ....... B60C 27/08; B60C 27/083; B60C 27/00; B60C 27/086; F16G 15/00
See application file for complete search history.

(56) References Cited

U.S. PATENT DOCUMENTS 1,635,017 A * 7/1927 Sunde ..................... B60C 27/08 152/239
3,714,976 A * 2/1973 Caldwell ............... B60C 27/086 D12/608
4,020,886 A * 5/1977 Daniel .................... B60C 27/08 152/243
10,266,021 B2 * 4/2019 Coles ...................... F16G 15/04

FOREIGN PATENT DOCUMENTS

EP 0049570 A2 * 4/1982 ............. B60C 27/08

OTHER PUBLICATIONS

Search report issued in priority European application No. EP 23162743.1, search completed Sep. 8, 2023, 3 pages.

* cited by examiner

*Primary Examiner* — S. Joseph Morano
*Assistant Examiner* — Taekwon Choi
(74) *Attorney, Agent, or Firm* — Meunier Carlin & Curfman LLC

(57) ABSTRACT

The present invention relates to a connecting element for connecting link chains. The connecting element comprises a base portion defining a centre hole, and a plurality of curved portions extending from the base portion, to which curved portions ends of link chains—can be releasably connected. In the connecting element, each of the plurality of curved portions is curved towards the centre hole. The invention also relates to a traction chain.

17 Claims, 3 Drawing Sheets

CONNECTING ELEMENT AND TRACTION CHAIN

PRIORITY

This is a U.S. non provisional patent application claiming priority to European patent application EP23162743.1 filed on Mar. 17, 2023, and incorporated herein by reference.

TECHNICAL FIELD

The present invention relates to a connecting element according to the preamble of the appended independent claim. The invention also relates to a traction chain comprising a plurality of connecting elements according to the invention.

BACKGROUND

Traction chains are widely used in forest machines, tractors, and trucks to improve grip and to protect tyres against stones and stumps. A typical traction chain comprises link chains that are connected to each other by connecting elements so that the link chains can form a desired pattern on the wear surface of a tyre. The traction chain has typically side chains for supporting the traction chain against the sides of the tyre. The traction chain can be equipped with studs to improve grip on snow and ice.

A problem associated with the known traction chains is that they are laborious and difficult to manufacture and assemble. Another problem associated with the known traction chains is that welding is needed to connect the link chains to each other. Yet another problem associated with the known traction chains is that they are difficult to mount on a tyre.

SUMMARY

It is the main objective of the present invention to reduce or even eliminate the prior art problems presented above.

It is an objective of the present invention to provide a connecting element for a traction chain. In more detail, it is an objective of the invention to provide a connecting element enabling to connect link chains to each other without welding. It is a further objective of the invention to provide a connecting element that is quick and easy to manufacture.

It is also an objective of the present invention to provide a traction chain that is quick and easy to manufacture and assemble. It is a further objective of the invention to provide a traction chain that is easy to mount on a tyre.

In order to realise the above-mentioned objectives, the connecting element according to the invention is characterised by what is presented in the characterising portion of the appended independent claim. Advantageous embodiments of the invention are described in the dependent claims.

DETAILED DESCRIPTION

Figure 1:
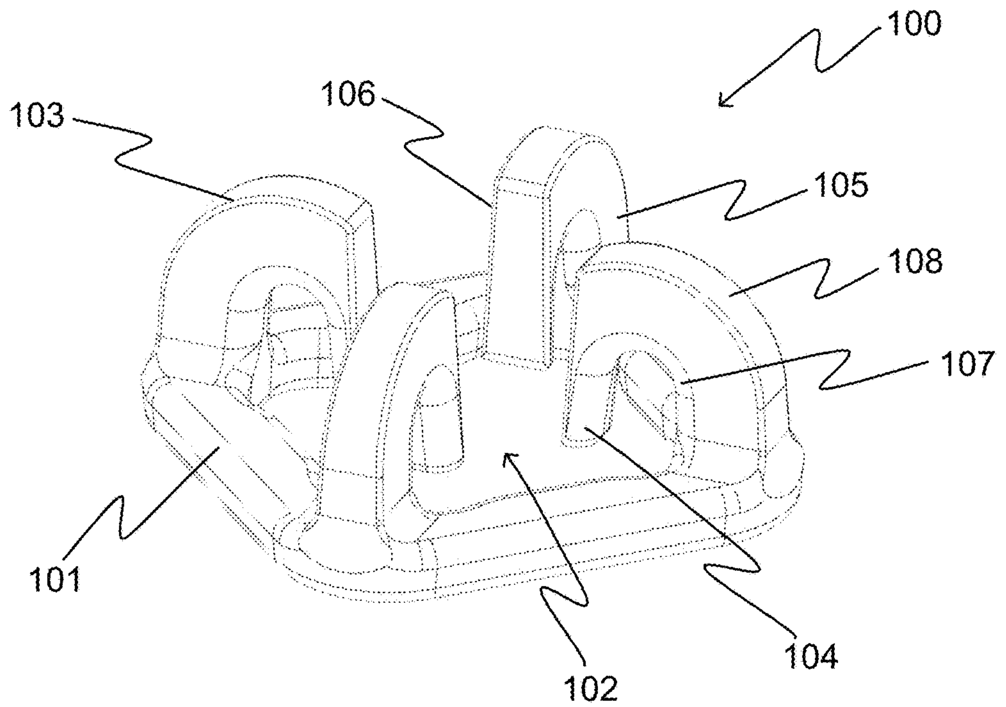
FIG. 1 illustrates a connecting element according to an embodiment of the invention.

A connecting element according to the invention for connecting link chains comprises a base portion defining a centre hole, and a plurality of curved portions extending from the base portion, to which curved portions ends of link chains can be releasably connected. In the connecting element according to the invention, each of the plurality of curved portions is curved towards the centre hole.

The connecting element according to the invention can be used in a traction chain to connect link chains to each other. A link chain is connected to the connecting element in such a manner that an end of the link chain, i.e., an end link, is connected to one of the curved portions. The number of curved portions defines the maximum number of link chains that can be connected to the connecting element. The connecting element may have, for example, two, three or four curved portions.

The base portion has two sides, i.e., a first side and a second side. The curved portions extend from the first side of the base portion. The second side of the base portion can be arranged against a tyre.

The base portion can have various forms and shapes. The base portion can have, for example, the form of a circular or polygonal ring. The base portion may have a flat or curved shape. The base portion can be curved to correspond the curvature of a tyre on which the connecting element is to be arranged. The thickness of the base portion can be, for example, 5-50 mm. The length and width, or the diameter of the base portion can be, for example, 50-400 mm. The centre hole can be, for example, circular and have the diameter of 45-350 mm, or rectangular and have the length and width of 45-350 mm.

The curved portions are hook-like elements, which extend from the base portion towards the centre hole. The curved portions are arranged to extend away from the first side of the base portion and to curve inwardly towards the centre hole. Preferably, the curved portions are arranged perpendicularly to the plane defined by the base portion. The tips of the curved portions point towards the centre hole. The tips of the curved portions may be arranged to extend into the centre hole. The curved portions enable ends of link chains to be releasably connected to the connecting element.

The curved portions are preferably arranged uniformly on the base portion. If the connecting element has an even number of curved portions, then the curved portions are preferably arranged in pairs opposite to each other. If the base portion has the form of a polygonal ring, such as a square or rectangular ring, then a curved portion is preferably arranged at each corner of the base portion. The curved portions are preferably sized according to the dimensions of the end links of the link chains.

A link chain can be connected to the connecting element as follows. First, an end link of the link chain is arranged in connection with one of the curved portions in such a manner that the tip of the curved portion protrudes into an opening defined by the end link. Then, the end link is moved along the curved portion while simultaneously rotating the end link, until the end link is at the base of the curved portion and rests on the base portion.

The connecting element according to the invention can be manufactured by using various techniques. Preferably, the connecting element is manufactured by casting or forging. Other possible manufacturing techniques are, for example, 3D printing and bending. The connecting element can be made in one piece, or from several pieces that are joined together, preferably by welding. The connecting element can be made of a metal, such as iron alloy, that can be hardened by heat treatment.

An advantage of the connecting element according to the invention is that it enables to connect link chains to each other without welding. Another advantage of the connecting element according to the invention is that a link chain can be attached to and detached from the connecting element quickly and easily. Yet another advantage of the connecting element according to the invention is that it is quick and easy to manufacture.

According to an embodiment of the invention tips of the plurality of curved portions are arranged to extend in an essentially perpendicular manner in relation to a plane defined by the base portion. The tips of the curved portions are arranged to point towards the centre hole of the base portion.

According to an embodiment of the invention the tips of the plurality of curved portions are arranged to extend into the centre hole. This ensures that the link chains can stay connected to the connecting element.

According to an embodiment of the invention each of the plurality of curved portions has planar sides. The distance between the planar sides of the curved portion, i.e., the thickness of the curved portion, is preferably only slightly smaller than the distance between the straight sections of the end link of the link chain, i.e., the width of an opening defined by the end link.

According to an embodiment of the invention the planar sides of the curved portion are tilted relative to each other. The planar sides are tilted in such a manner that the distance between the planar sides decreases away from the base portion. An angle between the planar sides of the curved portion can be, for example, less than 5 degrees or less than 1 degree. An advantage of the tilted planar sides is that it facilitates the manufacturing of the connecting element.

According to an embodiment of the invention each of the plurality of curved portions has an inner edge having a semi-circular cross section. The radius of the semi-circle preferably corresponds to the radius of bent sections of the end link. The radius of the semi-circle can be, for example, 5-50 mm. An outer edge of the curved portion may also have a semi-circular cross section.

According to an embodiment of the invention the distance between the inner edge and an outer edge of the curved portion decreases towards the tip of the curved portion. This facilitates the connecting of an end link of a link chain to the curved portion.

According to an embodiment of the invention the number of curved portions is at least three. The number of curved portions can be, for example, three, four, five or six, or at least four or at least five. The curved portions are preferably arranged uniformly on the base portion.

According to an embodiment of the invention the connecting element has an even number of curved portions, wherein the curved portions are arranged in pairs opposite to each other. The number of curved portions can be, for example, two, four or six. The curved portions are preferably arranged uniformly on the base portion.

According to an embodiment of the invention the base portion has a flat or curved shape. The base portion can be curved to correspond the curvature of a tyre on which the connecting element is to be arranged.

According to an embodiment of the invention the base portion has the form of a circular or polygonal ring. If the base portion has the form of a polygonal ring, such as a square or rectangular ring, then a curved portion is preferably arranged at each corner of the base portion.

According to an embodiment of the invention the connecting element is made in one piece by casting or forging. An advantage of making the connecting element in one piece is that welding is not needed.

According to an embodiment of the invention the connecting element is made from several pieces that are joined together by welding. Separate pieces can be made by casting or forging. An advantage of making the connecting element from several pieces is that the pieces are easier to manufacture compared to a case where the connecting element is made in one piece.

According to an embodiment of the invention the connecting element is made of iron alloy.

The present invention also relates to a traction chain. A traction chain according to the invention comprises a plurality of link chains, and a plurality of connecting elements according to the invention with which connecting elements the link chains are releasably connected to each other.

The traction chain according to the invention can be mounted on a tyre of a vehicle, such as a forest machine, a tractor, or a truck. The traction chain has a pattern that depends on the number of connecting elements and link chains as well as the number of curved portions in the connecting elements and the number of links in the link chains. Thus, a desired pattern for each traction chain can be obtained by using the right number of suitable connecting elements and link chains.

The traction chain may have connecting elements with the same or different number of curved portions. For example, the traction chain may have connecting elements with three curved portions or connecting elements with four curved portions, or both. The link chains of the traction chain may also have the same or different number of links. For example, the traction chain may only have three-part link chains, or additionally or alternatively some other odd-numbered link chains. The traction chain may also comprise side link chains for supporting the traction chain against the sides of a tyre.

An advantage of the traction chain according to the invention is that it is quick and easy to manufacture and assemble. Another advantage of the traction chain according to the invention is that it is easy to mount on a tyre. Yet another advantage of the traction chain according to the invention is that welding is not needed in connecting the link chains.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

The exemplary embodiments presented in this text and their advantages relate by applicable parts to the connecting element as well as the traction chain according to the invention, even though this is not always separately mentioned.

DETAILED DESCRIPTION OF THE DRAWINGS

FIG. 1 illustrates a connecting element according to an embodiment of the invention. The connecting element 100 comprises a base portion 101 that defines a centre hole 102, and four curved portions 103 that extend from an upper side of the base portion 101. An underside of the base portion 101 is meant to be arranged against a tyre.

The connecting element 100 can be used in a traction chain to connect link chains to each other. A link chain is connected to the connecting element 100 in such a manner that an end of the link chain, i.e., an end link, is connected to one of the curved portions 103.

The base portion 101 has the form of a square ring. The curved portions 103 are arranged at the corners of the base portion 101. The curved portions 103 extend perpendicularly away from the upper side of the base portion 101, and they are arranged to curve inwardly towards the centre hole 102 in such a manner that tips 104 of the curved portions 103 extend essentially perpendicularly into the centre hole 102.

Each curved portion 103 has planar sides 105 and 106, which are tilted relative to each other. The planar sides 105 and 106 are tilted in such a manner that the distance between the planar sides 105 and 106 decreases away from the base portion 101. The distance between the planar sides 105 and 106 is only slightly smaller than the distance between straight sections of an end link that is to be connected to the curved portion 103.

Each curved portion 103 has an inner edge 107 having a semi-circular cross section. The radius of the semi-circle essentially corresponds to the radius of bent sections of the end link that is to be connected to the curved portion 103. The distance between the inner edge 107 and an outer edge 108 of the curved portion 103 decreases towards the tip 104.

FIGS. 2A-2D illustrate the connecting of a link chain to the connecting element of FIG. 1. Only an end link 200 of the link chain is shown in FIGS. 2A-2D.

Figure 2A:
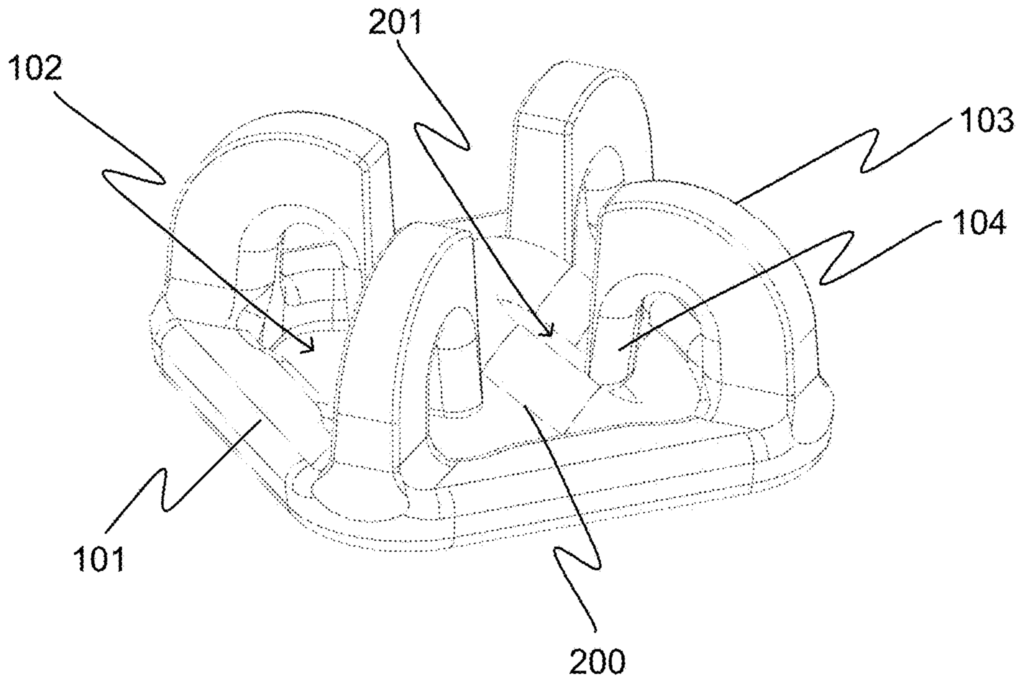
FIGS. 2A-2D illustrate the connecting of a link chain to the connecting element of FIG. 1.
Figure 2B:
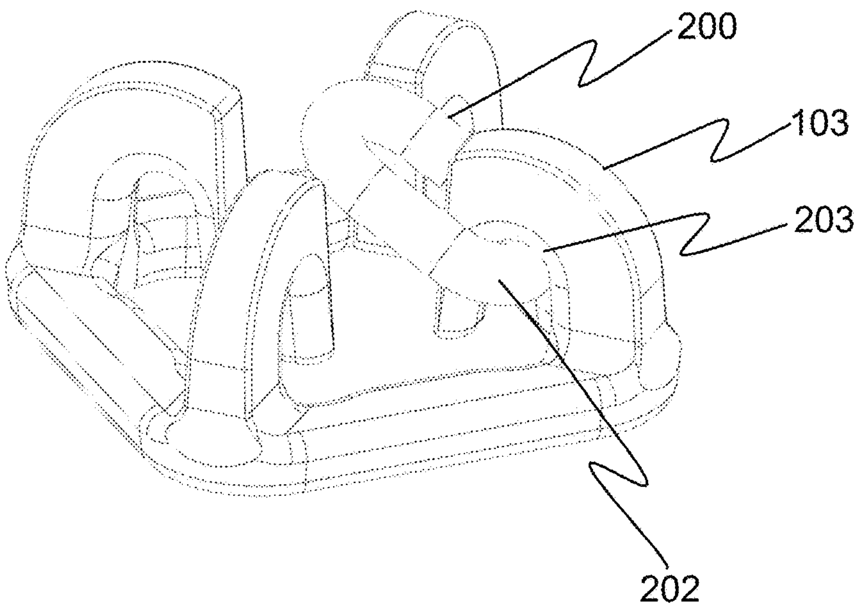
Figure 2C:
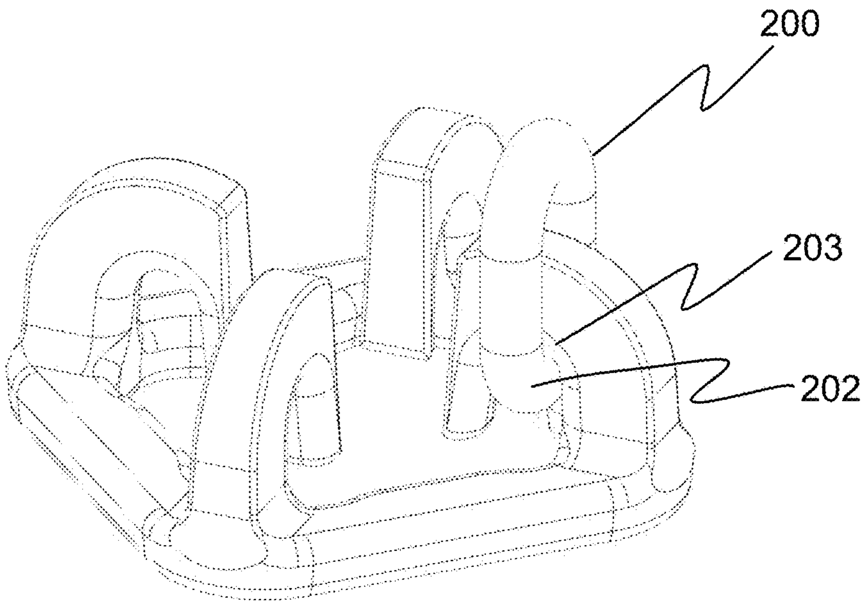
Figure 2D:
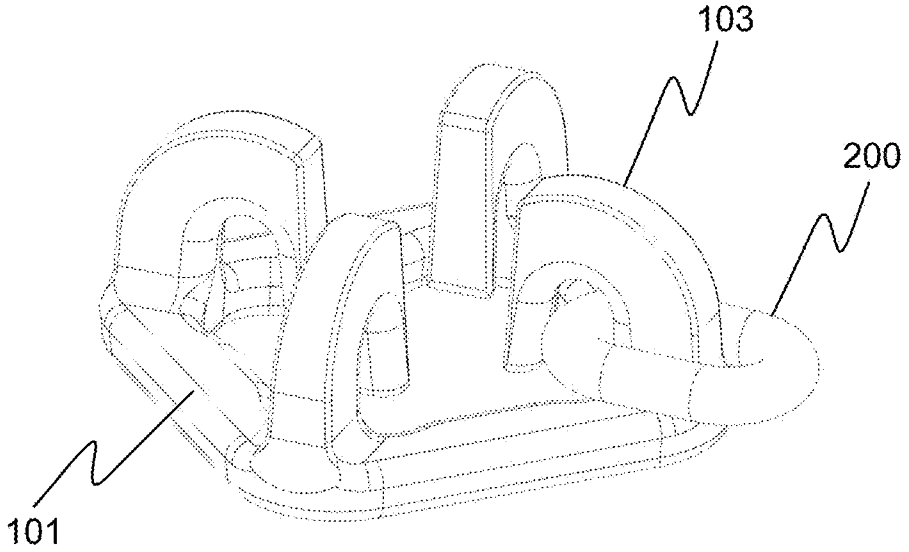

First, the end link 200 is arranged in connection with one of the curved portions 103 in such a manner that the tip 104 of the curved portion 103 protrudes into an opening 201 defined by the end link 200. The end link 200 is arranged partly into the centre hole 102 and at an angle relative to the base portion 101. This situation is shown in FIG. 2A. Next, the end link 200 is moved upwards along the curved portion 103 until a bent section 202 of the end link 200 meets an inner curvature 203 of the curved portion 103. This situation is shown in FIG. 2B. Then, the end link 200 is rotated, while the bent section 202 is kept in contact with the inner curvature 203. This situation is shown in FIG. 2C. Finally, the end link 200 is moved along the curved portion 103 while simultaneously rotating the end link 200, until the end link 200 rests on the base portion 101. This situation is shown in FIG. 2D.

Figure 3:
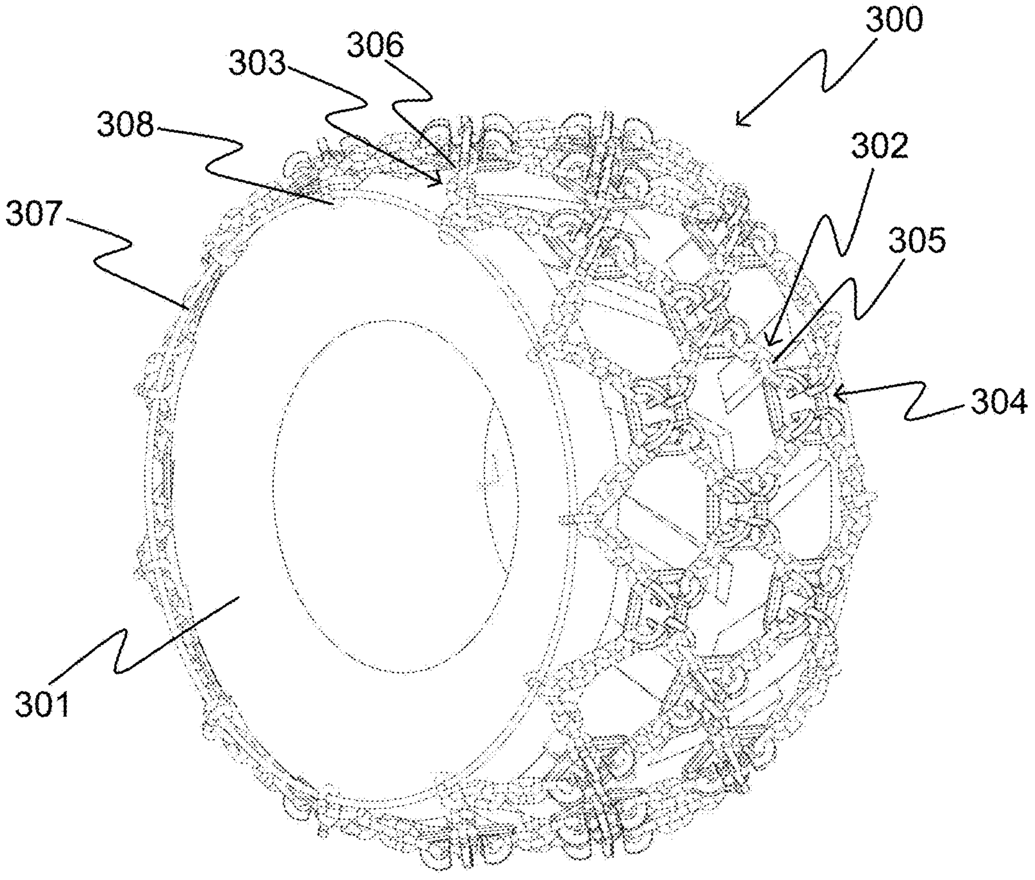
FIG. 3 illustrates a traction chain according to an embodiment of the invention mounted on a tyre.

FIG. 3 illustrates a traction chain according to an embodiment of the invention. The traction chain 300 is mounted on a tyre 301.

The traction chain 300 comprises two kinds of link chains 302 and 303, which are connected to each other with connecting elements 304. The link chains 302 consist of three links 305 and the link chains 303 consist of nine links 306. The connecting elements 304 are arranged in three rows so that in the centre row the connecting elements 304 are connected to four link chains 302 and in the side rows the connecting elements 304 are connected to two link chains 302 and to two link chains 303. The link chains 302 and 303 and the connecting elements 304 form a diamond pattern on the wear surface of the tyre 301.

The traction chain 300 comprises wires 307 for supporting the traction chain 300 against the sides of the tyre 301. The wires 307 are connected to the link chains 303 with connecting links 308.

The link chains 302 and 303 are releasably connected to the connecting elements 304. However, when the traction chain 300 is mounted on the tyre 301, the link chains 302 and 303 cannot be detached, and they cannot come loose because of the beneficial structure of the connecting elements 304.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A connecting element for connecting link chains, comprising:

a base portion defining a centre hole, wherein the connecting element comprises a plurality of curved portions extending from the base portion, wherein the curved portions releasably connect ends of the link chains to the connecting element, wherein each of the plurality of curved portions is curved towards the centre hole, and wherein the ends of the link chains are inserted through the centre hole of the base portion and into engagement with the curved portion to releasably connect the link chains to one of the plurality of curved portions.

2. The connecting element according to claim 1, wherein tips of the plurality of curved portions are arranged to extend in an essentially perpendicular manner in relation to a plane defined by the base portion.

3. The connecting element according to claim 2, wherein the tips of the plurality of curved portions are arranged to extend into the centre hole.

4. The connecting element according to claim 1, wherein, each of the plurality of curved portions has planar sides.

5. The connecting element according to claim 4, wherein the planar sides of the curved portions are tilted relative to each other.

6. The connecting element according to claim 1, wherein each of the plurality of curved portions has an inner edge having a semi-circular cross section.

7. The connecting element according to claim 6, wherein a distance between the inner edge and an outer edge of the curved portion decreases towards a tip of the curved portion.

8. The connecting element according to claim 1, wherein the connecting element comprises at least three curved portions.

9. The connecting element according to claim 1, wherein the connecting element has an even number of curved portions, and wherein the curved portions are arranged in pairs opposite to each other.

10. The connecting element according to claim 1, wherein the base portion has a planar or curved shape.

11. The connecting element according to claim 1, wherein the base portion has a form of a circular or polygonal ring.

12. The connecting element according to claim 1, wherein the connecting element is made in one piece by casting or forging.

13. The connecting element according to claim 1, wherein the connecting element is made from several parts that are joined together by welding.

14. The connecting element according to claim 1, wherein the connecting element is made of iron alloy.

15. A traction chain, comprising:

a plurality of link chains, wherein the traction chain comprises a plurality of the connecting elements of claim 1 releasably connecting the plurality of link chains to each other.

16. The connecting element according to claim 1, wherein the base portion defines an outer ring surface, the curved portion extends from an upper side of the outer ring surface and curves inward towards the centre hole such that a tip of the curved portion is positioned within the centre hole.

17. A connecting element for connecting link chains, comprising:

a base portion defining a centre hole and an outer ring surface, wherein the connecting element comprises a plurality of curved portions extending from an upper side of the outer ring surface, each of the plurality of curved portions curving inward towards the centre hole such that a tip of each of the plurality of curved portions is positioned within the centre hole, and wherein the curved portions releasably connect ends of the link chains to the connecting element.

* * * * *